United States Patent
Kodama

(10) Patent No.: US 9,162,555 B2
(45) Date of Patent: Oct. 20, 2015

(54) VEHICLE BACK DOOR

(71) Applicant: DaikyoNishikawa Corporation, Hiroshima (JP)

(72) Inventor: Hiroki Kodama, Hiroshima (JP)

(73) Assignee: DaikyoNishikawa Corporation, Hiroshima (JP)

( * ) Notice: Subject to any disclaimer, the term of this patent is extended or adjusted under 35 U.S.C. 154(b) by 0 days.

(21) Appl. No.: 14/683,326

(22) Filed: Apr. 10, 2015

(65) Prior Publication Data

US 2015/0210147 A1  Jul. 30, 2015

Related U.S. Application Data

(63) Continuation of application No. PCT/JP2013/006136, filed on Oct. 16, 2013.

(30) Foreign Application Priority Data

Oct. 17, 2012   (JP) ................................. 2012-229751

(51) Int. Cl.
   *B60J 5/10*   (2006.01)
(52) U.S. Cl.
   CPC ...................................... *B60J 5/107* (2013.01)
(58) Field of Classification Search
   CPC ............... B60J 5/10; B60J 5/101; B60J 5/107
   USPC ....................................................... 296/146.8
   See application file for complete search history.

(56) References Cited

U.S. PATENT DOCUMENTS

| | | | | |
|---|---|---|---|---|
| 6,068,327 A | * | 5/2000 | Junginger | 296/146.13 |
| 8,403,399 B2 | * | 3/2013 | Kuntze et al. | 296/146.8 |
| 8,550,536 B2 | * | 10/2013 | Gachter et al. | 296/146.8 |
| 8,567,841 B2 | * | 10/2013 | Ginestet et al. | 296/56 |
| 2007/0145768 A1 | * | 6/2007 | Saitoh et al. | 296/146.5 |
| 2007/0170751 A1 | * | 7/2007 | Tanaka et al. | 296/146.6 |
| 2014/0167446 A1 | * | 6/2014 | Iwano et al. | 296/146.8 |

FOREIGN PATENT DOCUMENTS

| | | | |
|---|---|---|---|
| DE | 102006050144 A1 | * | 4/2008 |
| DE | 202014105456 U1 | * | 12/2014 |
| FR | 1083515 A | * | 1/1955 |
| JP | 2008-037164 A | | 2/2008 |
| JP | 2012-101740 A | | 5/2012 |
| WO | WO 2008153197 A1 | * | 12/2008 |
| WO | WO 2009/143627 A1 | | 12/2009 |
| WO | WO 2010130958 A1 | * | 11/2010 |
| WO | WO 2011058658 A1 | * | 5/2011 |

OTHER PUBLICATIONS

International Search Report for corresponding International Application No. PCT/JP2013/006136 mailed Dec. 10, 2013.
Form PCT/ISA/237 for corresponding International Application No. PCT/JP2013/006136 dated Dec. 10, 2013.

* cited by examiner

*Primary Examiner* — H Gutman
(74) *Attorney, Agent, or Firm* — Renner, Otto, Boisselle & Sklar, LLP

(57) ABSTRACT

A right reinforcing rib 25 is disposed on a straight line connecting a left hinge attachment location 15 with an inner wall 17 in a region surrounded by a left hinge attachment location 15, a right end of a lower edge of a door inner panel 3, and a right virtual corner 26a. A left reinforcing rib 25 is disposed on a straight line connecting a right hinge attachment location 15 with the inner wall 17 in a region surrounded by a right hinge attachment location 15, a left end of the lower edge of the door inner panel 3, and a left virtual corner 26b.

3 Claims, 5 Drawing Sheets

VEHICLE BACK DOOR

CROSS-REFERENCE TO RELATED APPLICATIONS

This is a continuation of International Application No. PCT/JP2013/006136 filed on Oct. 16, 2013, which claims priority to Japanese Patent Application No. 2012-229751 filed on Oct. 17, 2012. The entire disclosures of these applications are incorporated by reference herein.

BACKGROUND

The present disclosure relates to improved vehicle back doors, and specifically to a resin door inner panel having improved rigidity, the resin door inner panel having an upper section supported to an upper section of a rear end of a vehicle body through a pair of hinges.

A typical hatchback vehicle, e.g., having a back door opening on a rear end of a vehicle body of the hatchback vehicle includes a back door that can rotate vertically to open and close the back door opening. Such a back door includes an upper half portion equipped with a window pane. Hinge attachment locations are provided above the window pane. The back door is coupled with an upper section of a rear end of a vehicle body through hinges mounted on the hinge attachment locations. A user lifts up a lower section of the back door to open the back door opening, and pushes down the lifted back door to close the back door opening.

In closing the back door opening, one of the right end portion or the left end portion of the lower section of the back door may be pushed down. In this case, the load is applied on one of the right end portion or the left end portion of the lower section of the back door. In this case, the shape of the upper half portion of back door can be kept because a relatively highly rigid window pane is mounted. However, the lower half portion of the back door might be deformed by the load applied on one of the right end portion or the left end portion because a member such as a rigid window pane is not mounted. Various solutions were provided to reduce such deformation.

Japanese Unexamined Patent Publication No. 2012-101740 (paragraphs 0010, 0011, and 0012; and FIGS. 1 and 2) discloses a back door including a generally rectangular resin inner panel and a generally rectangular resin outer panel assembled to the inner panel. A rectangular reinforcing member, which is a metal pipe, is mounted on a surface of the inner panel along an outer periphery of the inner panel. This surface faces the outer panel. The reinforcing member secures the rigidity and reduces the deformation described above.

However, the back door of Patent Document 1 is equipped with the metal reinforcing member, and has unnecessary weight. This back door also inconveniently causes a trouble in mounting the reinforcing member.

It is an object of the present disclosure to increase the rigidity of a back door without an increase in the weight thereof, and reduce the deformation of a lower half portion of the back door.

SUMMARY

To achieve the object, the present disclosure provides an improved layout of a reinforcing rib provided on a door inner panel.

Specifically, the present disclosure relates to a vehicle back door. The vehicle back door includes a generally rectangular resin door inner panel on which a pair of hinges attachment locations are spaced from each other along a vehicle width on an upper section thereof and which have a window opening in an upper half portion thereof. The vehicle back door also includes a resin door outer panel surrounding the window opening and assembled to the door inner panel. The vehicle back door also includes a window pane attached to the window opening to which the door outer panel is assembled. The hinge attachment locations of the door inner panel are coupled to a pair of hinges spaced from each other along the vehicle width on an upper section of a rear end of a vehicle body such that the back door swings upward to open and downward to close a back door opening of the rear end of the vehicle body. The present disclosure provides the following solutions.

In the first aspect of the present disclosure, an annular first wall stands and protrudes on an entire outer periphery of the door inner panel toward the door outer panel. A second wall stands and protrudes on at least a lower frame of an inner periphery of the window opening in the door inner panel toward the door outer panel. A pair of reinforcing ribs are located below the pair of hinge attachment locations of the door inner panel and are spaced from each other along the vehicle width such that the pair of reinforcing ribs connect the first wall and the second wall. One of the pair of reinforcing ribs on a right side along the vehicle width is disposed on a straight line connecting one of the pair of hinge attachment locations on a left side along the vehicle width with the second wall in a region surrounded by the one of the hinge attachment locations on the left side along the vehicle width, a right end along the vehicle width of a lower edge of the door inner panel, and a virtual corner connecting an extension line from right side edge on a right side of the vehicle width of the door inner panel and an extension line from the right end of the lower edge of the door inner panel. One of the pair of reinforcing ribs on a left side along the vehicle width is disposed on a straight line connecting one of the pair of hinge attachment locations on a right side along the vehicle width with the second wall in a region surrounded by the one of the hinge attachment locations on the right along the vehicle width, a left end along the vehicle width of the lower edge of the door inner panel, and a virtual corner connecting an extension line from a left side edge on a left side of the vehicle width of the door inner panel and an extension line from the left end of the lower edge of the door inner panel.

In the second aspect of the present disclosure, a rigid part that is L-shaped in cross section is provided on an end of each of the pair of reinforcing ribs of the first aspect of the present disclosure.

In the third aspect of the present disclosure, an end of each of the pair of reinforcing ribs of the first or second aspect of the present disclosure is bonded to the door outer panel.

According to the first aspect of the present disclosure, the pair of reinforcing ribs are spaced from each other along the vehicle width below the hinge attachment locations of the door inner panel. The reinforcing rib is integrated with the door inner panel, and couples the first wall with the second wall, both of which have relatively high rigidity in the door inner panel. That is, both the reinforcing ribs provide relatively high rigidity on the lower half portion of the back door.

The right reinforcing rib is disposed on the straight line connecting the left hinge attachment location with the second wall in the region surrounded by the left hinge attachment location, the right end of the lower edge of the door inner panel, and the virtual corner connecting the extension line from the right side edge on a right side of the vehicle width of the door inner panel and the extension line of the lower edge of the door inner panel. That is, when the right end portion of the lower section of the back door is pushed down, the load applied on the back door acts on the left hinge attachment location located on the straight line of the right reinforcing rib through the right reinforcing rib and the second wall, which have relatively high rigidity. The left reinforcing rib is also disposed similarly to the right reinforcing rib. Thus, when the left end portion of the lower section of the back door is pushed down, the load applied on the back door acts on the right hinge attachment location located on the straight line of the left reinforcing rib through the left reinforcing rib and the second wall, which have relatively high rigidity.

In this manner, both the reinforcing ribs integrated with the lower half portion of the door inner panel increases the rigidity of the lower half portion of the back door. These reinforcing ribs disposed as described above also enables the load to act on the hinge attachment location through the relatively highly rigid part of the back door when one of the right end portion or the left end portion of the lower section of the back door is pushed down, thereby preventing heavy load from being applied on one of the right end portion or the left end portion of the lower half portion of the back door. That is, an increase in the weight can be reduced, and the deformation of the lower half portion of the back door can be also reduced.

According to the second aspect of the present disclosure, a rigid part that is L-shaped in cross section is provided on the end of the reinforcing rib. This further increases the rigidity of the reinforcing rib, and reduces the deformation of the lower half portion of the back door. In addition, because of the rigid part provided on the end of the reinforcing rib, the base end of the reinforcing rib can be relatively thin. Thus, generation of sink marks on positions corresponding to the reinforcing rib of the door inner panel can be reduced, and thus damages to the appearance of the door inner panel can be also reduced.

According to the third aspect of the present disclosure, the adhesion of the end of the reinforcing rib to the door outer panel increases the rigidity of the lower half portion of the back door.

DETAILED DESCRIPTION

An embodiment of the present disclosure will be described with reference to the drawings.

Figure 1:
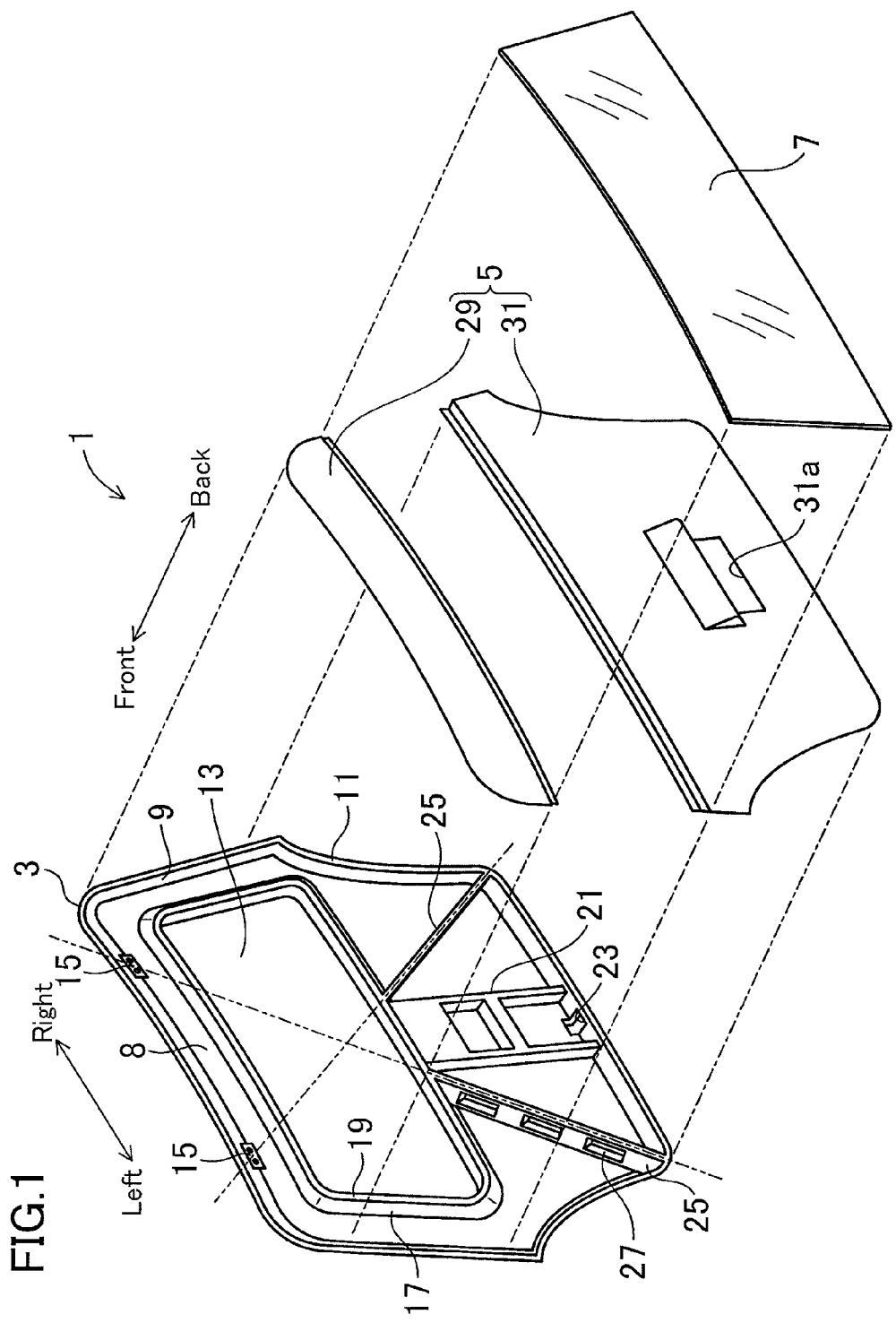
FIG. 1 is an exploded perspective view of a vehicle back door of an embodiment.
Figure 2:
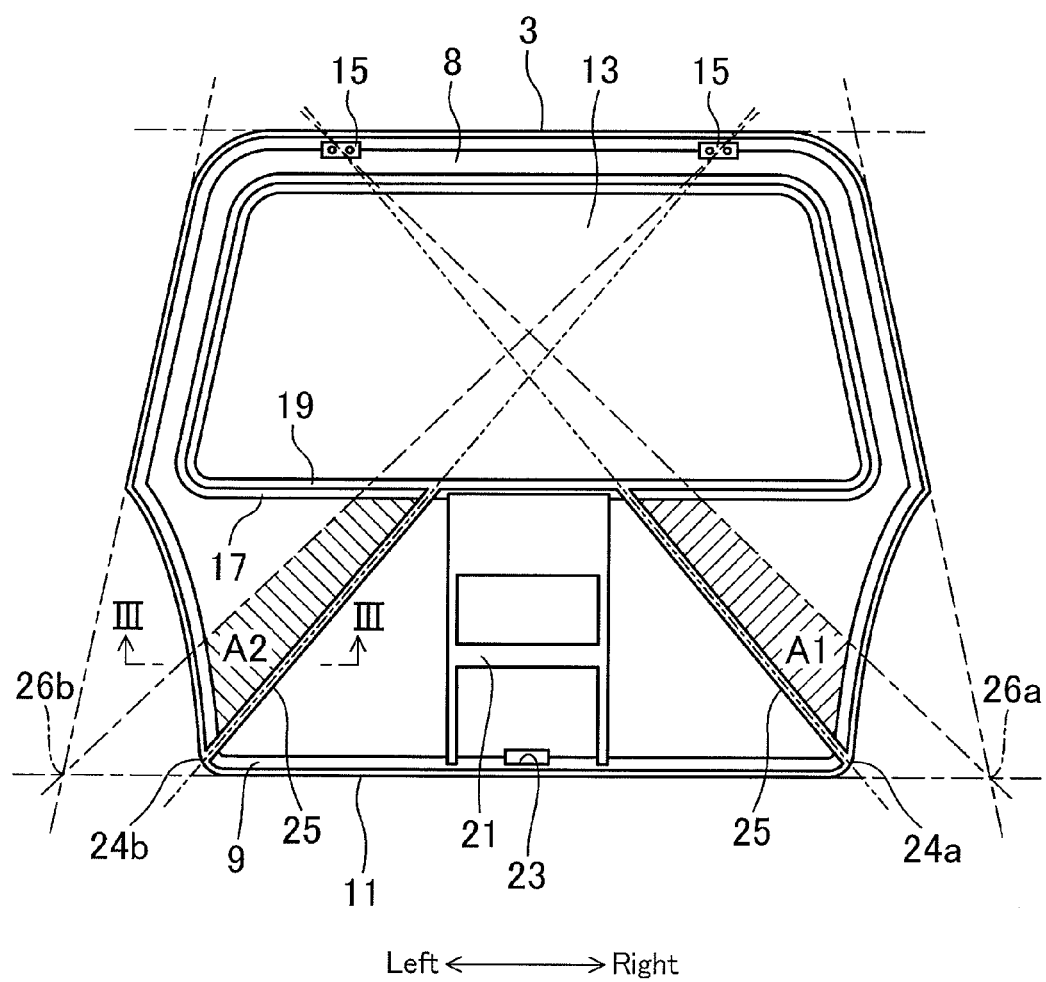
FIG. 2 is a front view of a door inner panel of the vehicle back door.

FIGS. 1 and 2 illustrate a vehicle back door 1 (hereinafter referred to as the back door 1) of this embodiment. This back door 1 swings upward to open and downward to close a back door opening (not shown) disposed on a rear end of a vehicle body (not shown) of a hatchback vehicle. A turn signal lamp (not shown) is provided on both right and left sides of a lower half portion of the back door opening of the vehicle body. The back door 1 includes a lower half part having a width that becomes narrower downward so that the turn signal lamp is exposed at the back of the vehicle body. The back door 1 includes a generally rectangular resin door inner panel 3, a resin door outer panel 5 assembled to the door inner panel 3, and a window pane 7.

The door inner panel 3 is a one piece panel. As illustrated in FIG. 2, the door inner panel 3 includes a body 8 having an upper half part and a lower half part. The upper half part is trapezoidal, and the lower half part becomes narrower downward. An annular outer wall (a first wall) 9 stands and protrudes on an entire outer periphery of the body 8 toward the door outer panel 5. A joint flange 11 extends outward from an entire protrusion end of the outer wall 9. A window opening 13 extending along the vehicle width is formed in an upper half part of the door inner panel 3. A pair of hinge attachment locations 15, 15 are spaced from each other along the vehicle width above the window opening 13. An annular inner wall (a second wall) 17 stands and protrudes on an entire inner periphery of the window opening 13 toward the door outer panel 5. A joint flange 19 extends inward of the window opening 13 from an entire protrusion end of the inner wall 17. A light attachment location 21 on which a light (not shown) for illuminating a registration plate (not shown) is formed in a middle portion along the vehicle width between a lower frame of the inner wall 17 and a lower frame of the outer wall 9. A locking device attachment location 23 is formed in a middle portion, along the vehicle width, of a lower end of the light attachment location 21, i.e., the lower frame of the outer wall 9. A locking device (not shown) that is engaged with or released from a striker (not shown) fixed on the vehicle body is attached on the locking device attachment location 23.

A pair of rectangular plate-shaped reinforcing ribs 25, 25 are located on both the right and left side of the light attachment location 21 of the door inner panel 3, and below the pair of hinge attachment locations 15, 15. The pair of rectangular plate-shaped reinforcing ribs 25, 25 stand and protrude on the body 8 toward the door outer panel 5. A space between the reinforcing ribs 25 becomes wider downward along the vehicle width, and the reinforcing ribs 25 connect the outer wall 9 with the inner wall 17.

The location of the reinforcing rib 25 will be described in detail below with reference to FIG. 2. An extension line of a right edge of the door inner panel 3 and an extension line of a lower edge of the door inner panel 3 join at a right virtual corner 26a near a right end 24a. A region A1 diagonally shaded in FIG. 2 is a region surrounded by the left hinge attachment location 15, the right end 24a of a lower edge of the door inner panel 3, and the right virtual corner 26a. In the region A1, the right reinforcing rib 25 is located on a straight line connecting the left hinge attachment location 15 with the inner wall 17.

On the other hand, an extension line of a left edge of the door inner panel 3 and an extension line of a lower edge of the door inner panel 3 join at a left virtual corner 26b near a left end 24b. A region A2 diagonally shaded in FIG. 2 is a region surrounded by the right hinge attachment location 15, the left end 24b of the lower edge of the door inner panel 3, and the left virtual corner 26b. In the region A2, the left reinforcing rib 25 is located on a straight line connecting the right hinge attachment location 15 with the inner wall 17.

Figure 3:
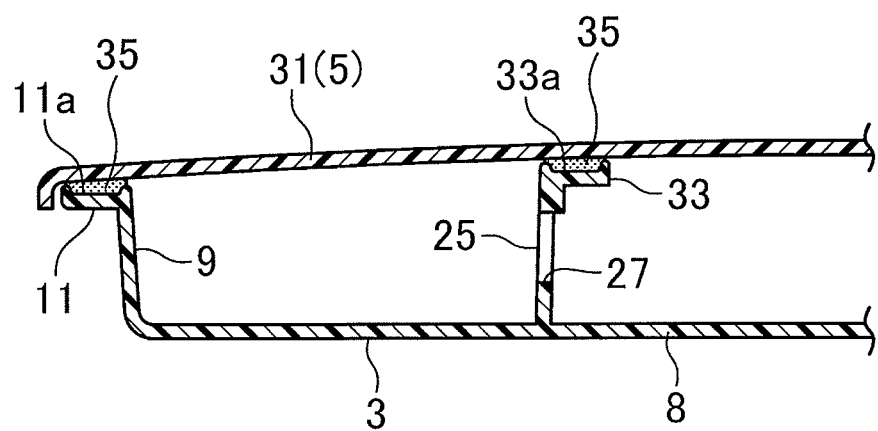
FIG. 3 is a cross-sectional view of the vehicle back door taken along the line III-III in FIG. 2.

FIG. 3 is a cross-sectional view of the back door 1 taken along the line III-III in FIG. 2. A base end of the left reinforcing rib 25 includes three through holes 27 spaced uniformly along the longitudinal direction of the left reinforcing rib 25. The through holes 27 each pass through along the thickness of the left reinforcing rib 25. An end of the reinforcing rib 25 has a rigid part 33 that is L-shaped in cross section. The rigid part 33 extends inward along the lateral direction, and is thicker than the base end of the reinforcing rib 25. That is, the rigid part 33 provided on the end of the reinforcing rib 25 increases the section modulus of the door inner panel 3, and the base end of the reinforcing rib 25 can be relatively thin. That is, the rigidity of the door inner panel 3 can be further increased. Generation of sink marks on positions corresponding to the reinforcing rib 25 can be also reduced, and thus damages to the appearance of the door inner panel 3 can be also reduced. Moreover, a recess 33a is formed on a surface of the end part, of the rigid part 33, extending inward along the lateral direction. This surface faces the door outer panel 5. The left reinforcing rib 25 is joined to the door outer panel 5 through an adhesive 35 applied on the recess 33a. This adhesion of the end of the reinforcing rib 25 to the door outer panel 5 increases the rigidity of the lower half portion of the back door 1. The right reinforcing rib 25 has the same configuration as that of the left reinforcing rib 25.

A recess 11a is also formed on a surface of the flange 11 formed on the outer wall 9. This surface faces the door outer panel 5. The outer wall 9 is joined to the door outer panel 5 through an adhesive 35 applied on the recess 11a.

The flange 19 formed on the inner wall 17 is joined to the window pane 7 through an adhesive (not shown). Part of the door outer panel 5 is sandwiched between the flange 19 and the inner wall 17. This joint of the relatively rigid window pane 7 increases the rigidity of an upper half portion of the back door 1.

The door outer panel 5 is assembled to the door inner panel 3, and surrounds the window opening 13. The door outer panel 5 includes an upper outer panel 29 and a lower outer panel 31. The upper outer panel 29 is assembled to an upper section of the door inner panel 3, and covers the pair of hinge attachment locations 15, 15. The lower outer panel 31 is assembled to a lower half part of the door inner panel 3. The upper outer panel 29 is generally rectangular plate-shaped, and is slender along the vehicle width. A step, which is a recess toward the front of the vehicle body, is formed on an entire lower end of the upper outer panel 29. On the other hand, the lower outer panel 31 is generally rectangular plate-shaped, and a lower half part of the lower outer panel 31 becomes narrower downward. A step, which is a recess toward the front of the vehicle body, is formed on an entire upper end of the lower outer panel 31. A registration plate attachment location 31a is formed in a middle portion of the lower outer panel 31.

The window pane 7 is rectangular plate-shaped. The window pane 7 is installed between the step on the lower end of the upper outer panel 29 and the step on the upper end of the lower outer panel 31 in a state in which the upper outer panel 29 and the lower outer panel 31 are assembled to the door inner panel 3. An upper end portion of the window pane 7 is joined to the upper outer panel 29 through an adhesive. A lower end portion of the window pane 7 is joined to the lower outer panel 31 through an adhesive. Both side portions of the window pane 7 are joined to the door inner panel 3 through an adhesive.

A pair of hinges (not shown) spaced from each other along the vehicle width on an upper section of the rear end of the vehicle body are coupled to the hinge attachment locations 15 of the door inner panel 3 so that the back door 1 having this configuration swings upward to open and downward to close the back door opening.

In this manner, the pair of reinforcing ribs 25, 25 are spaced from each other along the vehicle width below the hinge attachment locations 15 of the door inner panel 3. The reinforcing rib 25 is integrated with the door inner panel 3, and couples the outer wall 9 with the inner wall 17, both of which have relatively high rigidity in the door inner panel 3. That is, both the reinforcing ribs 25, 25 provide relatively high rigidity on the lower half portion of the back door 1.

In the region A1, the right reinforcing rib 25 is also located on the straight line connecting the left hinge attachment location 15 with the inner wall 17. Thus, when a right end portion of a lower section of the back door 1 is pushed down, the load applied on the back door 1 acts on the left hinge attachment location 15 located on the straight line of the right reinforcing rib 25 through the right reinforcing rib 25 and the inner wall 17, which have relatively high rigidity. The left reinforcing rib 25 is also disposed similarly to the right reinforcing rib 25. Thus, when a left end portion of the lower section of the back door 1 is pushed down, the load applied on the back door 1 acts on the right hinge attachment location 15 located on the straight line of the left reinforcing rib 25 through the left reinforcing rib 25 and the inner wall 17, which have relatively high rigidity.

In this manner, both the reinforcing ribs 25, 25 integrated with the lower half portion of the door inner panel 3 increases the rigidity of the lower half portion of the back door 1. These reinforcing ribs 25, 25 disposed as described above also enables the load to act on the hinge attachment location 15 through the relatively highly rigid part of the back door 1 when one of the right end portion or the left end portion of the lower section of the back door 1 is pushed down, thereby preventing heavy load from being applied on one of the right end portion or the left end portion of the lower half portion of the back door 1. That is, an increase in the weight can be reduced, and the deformation of the lower half portion of the back door 1 can be also reduced.

Figure 4:
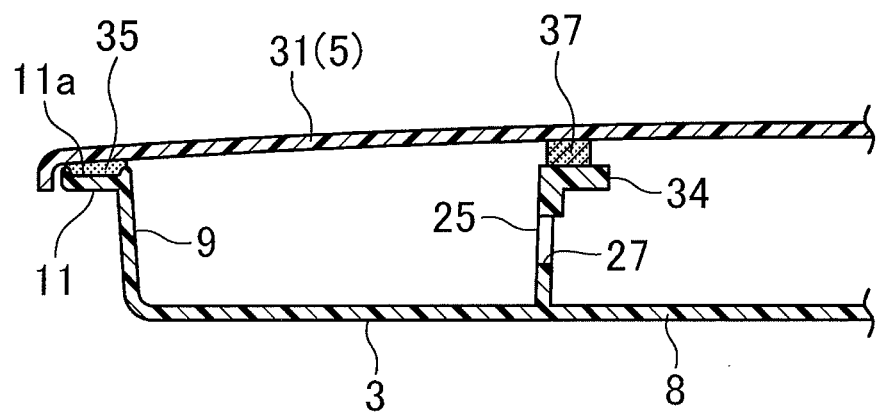
FIG. 4 illustrates an alternative example of the vehicle back door of FIG. 3.

In the embodiment, the rigid part 33 of the reinforcing rib 25 and the lower outer panel 31 are bonded. Alternatively, for example, as illustrated in FIG. 4, the rigid part 34 may be in contact with the lower outer panel 31 through an antinoise cushioning media 37. In this alternative embodiment, the rigidity of the surface of the door outer panel 5 can be increased without affecting the appearance of the door outer panel 5.

Figure 5:
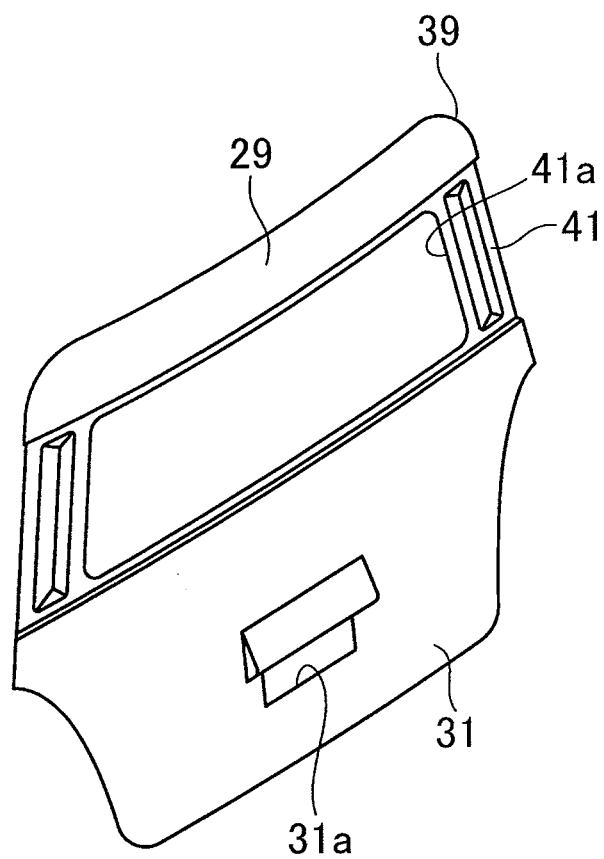
FIG. 5 is an overall perspective view of a door outer panel of a vehicle back door of another alternative example.

In the embodiment, the door outer panel 5 includes the two separated panels: the upper outer panel 29 and the lower outer panel 31. Alternatively, for example, as illustrated in FIG. 5, the door outer panel 5 may be one piece panel. In this case, the upper outer panel 29, the lower outer panel 31, and a middle outer panel 41 are integrated together to serve as a door outer panel 39. The middle outer panel 41 is disposed between the upper outer panel 29 and the lower outer panel 31, and includes a window opening 41a.

Figure 6:
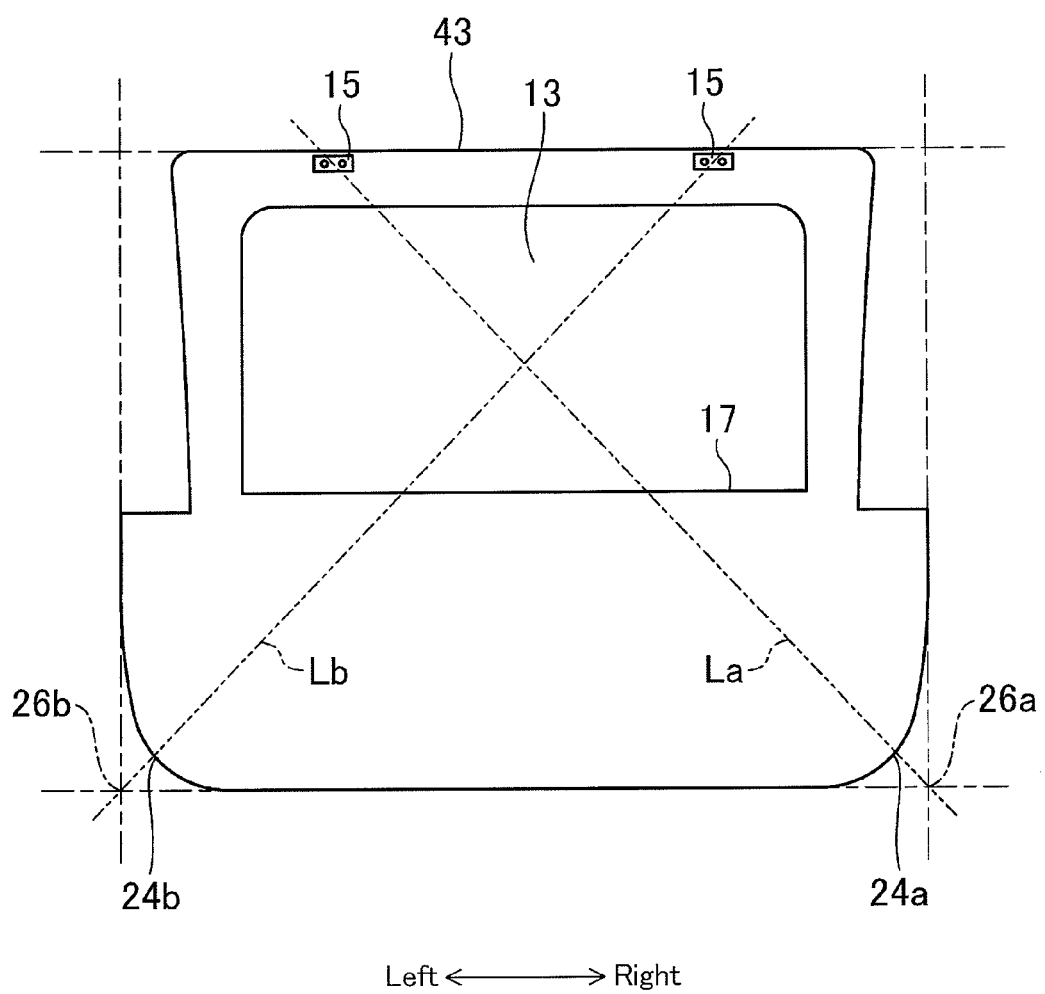
FIG. 6 is a front view of a vehicle back door of another alternative example.

Moreover, in the embodiment, the back door 1 includes the lower half portion becoming narrower downward in accordance with the vertical positions of the turn signal lamps provided on the rear end of the vehicle body. Alternatively, for example, as illustrated in FIG. 6, the back door 1 may have an upper half portion narrower than a lower half portion in accordance with a vehicle body having turn signal lamps provided an upper half portion of a rear end of a vehicle body. The lower half portion of this back door 1 is rectangular. In this case, a right side end 24a on a lower end of a door inner panel 43 and a right virtual corner 26a are located on the straight line connecting the left hinge attachment location 15 with the inner wall 17. Thus, the right reinforcing rib 25 is disposed on a chain double-dashed line La in FIG. 6. Similarly, the left reinforcing rib 25 is disposed on a chain double-dashed line Lb in FIG. 6.

Further, in the embodiment, the inner wall 17 protrudes on the entire inner periphery of the window opening 13. Alternatively, the inner wall 17 only has to protrude on at least a lower frame of the inner periphery.

As described above, the vehicle back door of the present disclosure can be used to reduce an increase in the weight and reduce the deformation of the lower half portion of the back door.

What is claimed is:

1. A vehicle back door comprising:
    a generally rectangular resin door inner panel (3, 43) on which a pair of hinge attachment locations (15) are spaced from each other along a vehicle width on an upper section thereof and which have a window opening (13, 41a) in an upper half portion thereof;
    a resin door outer panel (5) surrounding the window opening (13, 41a) and assembled to the door inner panel (3, 43); and
    a window pane (7) attached to the window opening (13, 41a) to which the door outer panel (5) is assembled, wherein
    the hinge attachment locations (15) of the door inner panel (3, 43) are coupled to a pair of hinges spaced from each other along the vehicle width on an upper section of a rear end of an upper section of a vehicle body such that the back door swings upward to open and downward to close a back door opening of the rear end of the vehicle body,
    an annular first wall (9) stands and protrudes on an entire outer periphery of the door inner panel (3, 43) toward the door outer panel (5),
    a second wall (17) stands and protrudes on at least a lower frame of an inner periphery of the window opening (13, 41a) in the door inner panel (3, 43) toward the door outer panel (5),
    a pair of reinforcing ribs (25) are located below the pair of hinge attachment locations (15) of the door inner panel (3, 43) and are spaced from each other along the vehicle width such that the pair of reinforcing ribs (25) connect the first wall (9) and the second wall (17) to each other,
    one of the pair of reinforcing ribs (25) on a right side along the vehicle width is disposed on a straight line connecting one of the pair of hinge attachment locations (15) on a left side along the vehicle width with the second wall (17) in a region surrounded by
        the one of the hinge attachment locations (15) on the left side along the vehicle width,
        a right end (24a) along the vehicle width of a lower edge of the door inner panel (3, 43), and
        a virtual corner (26a) connecting an extension line from a right side edge on a right side of the vehicle width of the door inner panel (3, 43) and an extension line from the right end (24a) of the lower edge of the door inner panel (3, 43), and
    one of the pair of reinforcing ribs (25) on a left side along the vehicle width is disposed on a straight line connecting one of the pair of hinge attachment locations (15) on a right side along the vehicle width with the second wall (17) in a region surrounded by
        the one of the hinge attachment locations (15) on the right side along the vehicle width,
        a left end (24b) along the vehicle width of the lower edge of the door inner panel (3, 43), and
        a virtual corner (26b) connecting an extension line from a left side edge on a left side of the vehicle width of the door inner panel (3, 43) and an extension line from the left end (24b) of the lower edge of the door inner panel (3, 43).

2. The vehicle back door of claim 1, wherein a rigid part (33, 34) that is L-shaped in cross section is provided on an end of each of the pair of reinforcing ribs (25).

3. The vehicle back door of claim 1, wherein an end of each of the pair of reinforcing ribs (25) is bonded to the door outer panel (5).

* * * * *